US007940252B2

(12) United States Patent
Chuang et al.

(10) Patent No.: US 7,940,252 B2
(45) Date of Patent: May 10, 2011

(54) OPTICAL SENSOR WITH PHOTO TFT (75) Inventors: Kai-Lan Chuang, Tainan (TW);
Ying-Lieh Chen, Tainan (TW)

(73) Assignee: Himax Technologies Limited, Tainan County (TW)

( * ) Notice: Subject to any disclaimer, the term of this patent is extended or adjusted under 35 U.S.C. 154(b) by 841 days.

(21) Appl. No.: 11/874,897

(22) Filed: Oct. 18, 2007

(65) Prior Publication Data
US 2009/0101900 A1    Apr. 23, 2009

(51) Int. Cl.
*G06F 3/042*  (2006.01)
*G06F 3/038*  (2006.01)
(52) U.S. Cl. .................... 345/175; 345/207
(58) Field of Classification Search ............ 345/81, 345/104, 173–175, 179, 182–183, 204–207; 178/18.01–18.03, 18.09, 20.01–20.03; 349/116
See application file for complete search history.

(56) References Cited

U.S. PATENT DOCUMENTS

| | | | | |
|---|---|---|---|---|
| 5,204,661 A * | 4/1993 | Hack et al. | | 345/88 |
| 5,386,543 A * | 1/1995 | Bird | | 358/1.1 |
| 7,741,646 B2 * | 6/2010 | Kang et al. | | 257/72 |
| 7,773,139 B2 * | 8/2010 | den Boer et al. | | 348/302 |
| 2002/0052192 A1 * | 5/2002 | Yamazaki et al. | | 455/411 |

OTHER PUBLICATIONS

"Active Matrix LCD with Integrated Optical Touch Screen", SID 03 Digest, pp. 1494-1497, by Willem den Boer et al.*
59.3: Integrated Optical Touch Panel in a 14.1 AMLCD, ADI Abileah et al. SID 04 Digest, 2004.

* cited by examiner

*Primary Examiner* — Bipin Shalwala
*Assistant Examiner* — Keith Crawley
(74) *Attorney, Agent, or Firm* — Squire, Sanders & Dempsey (US) LLP (57) ABSTRACT

An optical sensor is disclosed. Each sensor pixel circuit of the optical sensor includes a first readout TFT for reading out voltage of a charge node, a second readout TFT for controllably resetting the charge node to a first reset voltage, and a photo TFT for discharging the voltage at the charge node to a second reset voltage in absence of an object(s).

19 Claims, 7 Drawing Sheets

OPTICAL SENSOR WITH PHOTO TFT

BACKGROUND OF THE INVENTION

1. Field of the Invention

The present invention generally relates to an optical sensor, and more particularly to an optical sensor with photo TFTs.

2. Description of the Prior Art

A touch panel integrated with a liquid crystal display (LCD) has advantages of easier and faster entry of information, and more interactive access, and thus obtains more use in portable devices such as mobile phones, personal digital assistants (PDA) or notebook computers.

In the conventional display with the touch panel, the touch panel is attached to the front of the display, which has the disadvantages of complicated assembly, increased weight, and reduced display transmission. For overcoming these disadvantages, another touch technology is disclosed to use an optical sensor array embedded in the thin-film-transistor (TFT) structure of an LCD, such as that disclosed in 'Integrated Optical Touch Panel in a 14.1" AMLCD' (SID 04 DIGEST, pp. 1544-1547) by Adi Abileah et al., and is incorporated herein in its entirety for reference.

In this type of touch panel embedded in the LCD, one readout TFT and one photo TFT constitute each sensor pixel circuit, in which the capture of image of a finger or fingers, for example, is performed by directly reading out the stored charge at each sensor pixel circuit. This type of conventional touch panel, albeit its simplicity, suffers drawbacks of noise coupling and crosstalk, and therefore results in impreciseness of the captured image. In other words, the location of image of a finger(s) cannot be precisely determined in the conventional touch panel.

For the foregoing reasons, a need has arisen to propose a novel touch panel, particularly the novel sensor pixel circuit architecture of the touch panel, to prevent the drawbacks in the conventional touch panel in order to capture precise image.

SUMMARY OF THE INVENTION

In view of the foregoing, it is an object of the present invention to provide an optical sensor capable of being embedded in a touch panel and integrated with a display to precisely determine the location and image of finger(s) or other object(s).

According to the object, the present invention provides an optical sensor. An active matrix area has sensor pixel circuits arranged in matrix form. Scan lines and readout lines are arranged in the active matrix area such that the scan lines and the readout lines respectively cross each other at one of the sensor pixel circuits. The sensor pixel circuit includes a first readout TFT for reading out voltage of a charge node, a second readout TFT for controllably resetting the charge node to a first reset voltage, and a photo TFT for discharging the voltage at the charge node to a second reset voltage in absence of an object(s). According to one embodiment, a scan driver sequentially asserts the scan lines; and a readout circuit analyzes analog signals outputted from the active matrix area, and then converts the analog signals into digital signals. An image processing circuit is then used to determine the location and image of the object(s).

DETAILED DESCRIPTION OF THE INVENTION

Figure 1:
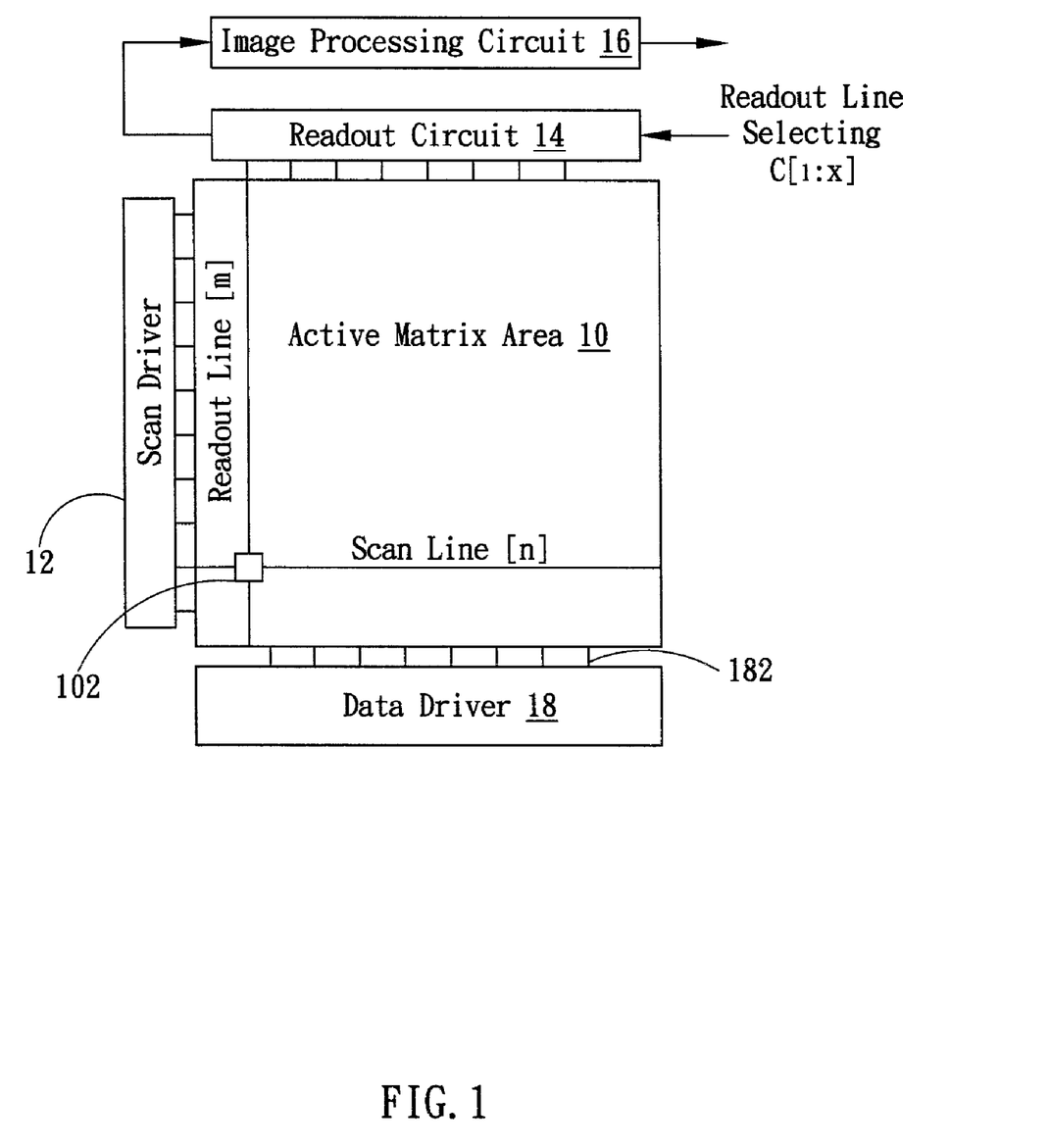
FIG. 1 illustrates a block diagram of a TFT finger sensor according to one embodiment of the present invention.

FIG. 1 illustrates a block diagram of a thin-film-transistor (TFT) finger sensor, or optical sensor generally, according to one embodiment of the present invention. The TFT finger sensor is embedded in a touch panel, which is further integrated with a display (not shown), such as a liquid crystal display (LCD) in this embodiment. It is appreciated by those skilled in the art that the finger sensor in this exemplary embodiment is used to capture the image of a finger or fingers, whilst the "finger" sensor is definitely not limited to capturing the finger(s); and furthermore, the object to be captured need not "touch" the touch panel. In fact, the optical sensor integrated with the display can be used to capture any object, such as a bar code or a light pen, which is close enough to the touch panel.

In FIG. 1, an active matrix area 10 contains a number of sensor pixel circuits (or sensor pixel cells) 102 arranged in matrix form for detecting the finger. The active matrix area 10 also contains a number of display pixel circuits (not shown), and some of the display pixel circuits are associatively integrated with the sensor pixel circuits. In practice, the quantity of the sensor pixel circuits in the active matrix area 10 is less than the quantity of the display pixels circuits. There are a number of (horizontal) scan lines and (vertical) readout lines arranged in the active matrix area 10 such that each sensor pixel circuit 102 at which one scan line crosses one readout line. A scan driver 12 asserts the scan lines by sequentially selecting the scan lines one at a time. In other words, a row of pixel circuits 102 is asserted by associated scan line at a time. A readout circuit 14 analyzes analog signals outputted from the active matrix area 10, and then converts the analog signals into digital signals. One of the analog signals outputted from the active matrix area 10 is selected in sequence under readout line selecting signals. The converted digital signals are subsequently forwarded to an image processing circuit 16 to determine the location and image of a finger or fingers. Data driver 18 is specifically used for driving the display pixel circuits via data lines 182 to display image on the LCD.

Figure 2A:
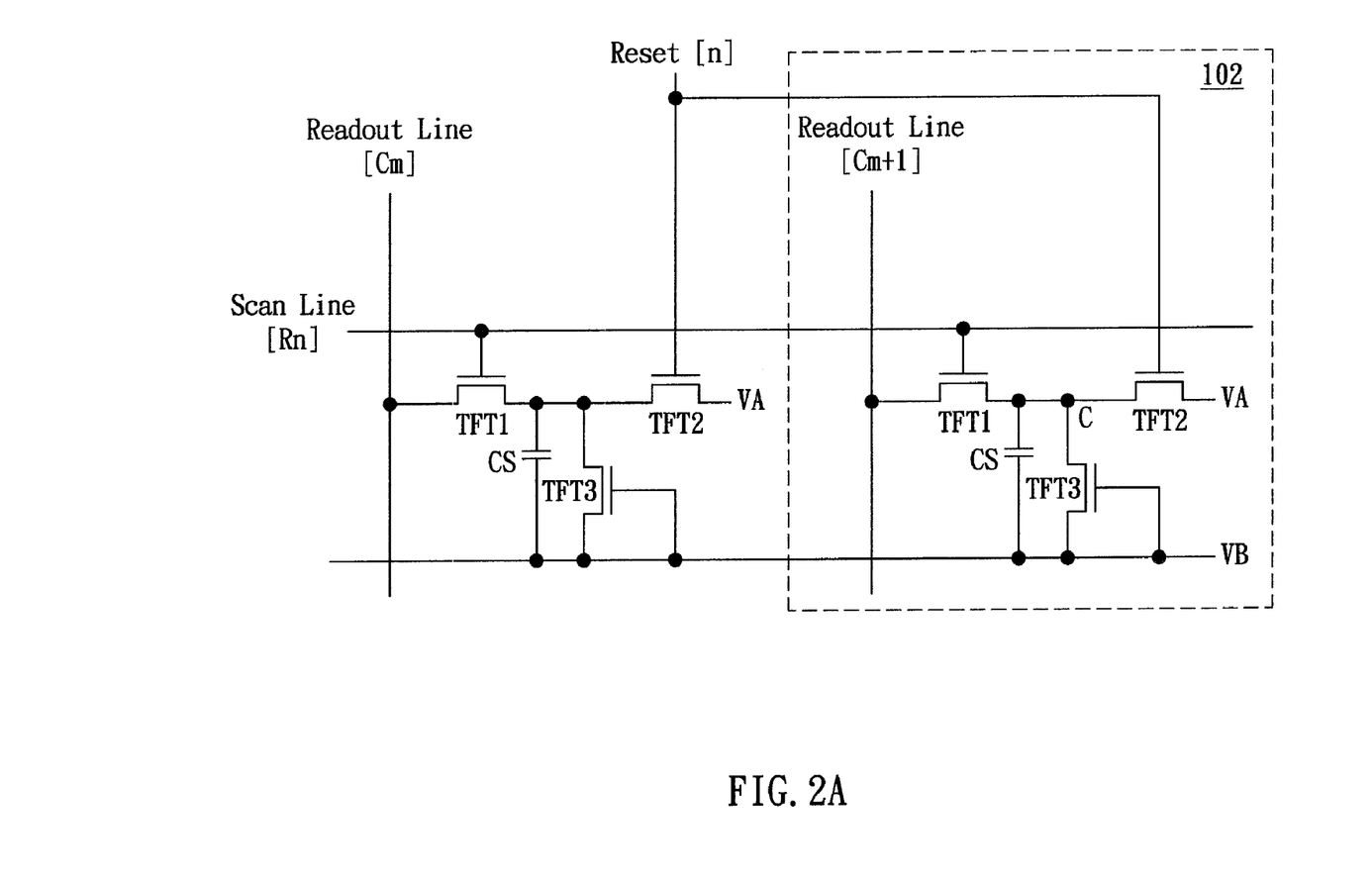
FIG. 2A illustrates the architecture of the sensor pixel circuits of FIG. 1 according to one embodiment of the present invention.

FIG. 2A illustrates the architecture of the sensor pixel circuits 102 of FIG. 1 according to one embodiment of the present invention. In the figure, only two sensor pixel circuits 102 are shown for the purpose of illustration, while other sensor pixel circuits 102 not shown could be well built in the same manner. Each sensor pixel circuit 102 includes a first readout TFT (TFT1), a second readout TFT (TFT2), and a photo TFT (TFT3) connected as shown. A scan line is associated with and connected to all of the sensor pixel circuits 102 on the same row. In this exemplary figure, Scan Line [$R_n$] is connected to the sensor pixel circuits 102 on the n-th row. A number of readout lines each is respectively associated with and connected to corresponding sensor pixel circuits 102 on the same column. In this exemplary figure, Readout Line [$C_{m+1}$] is connected to sensor pixel circuits 102 on the (m+1)-th column. A reset signal is associated with and connected to all of the sensor pixel circuits 102 on the same row. In this exemplary figure, Reset [n] signal is connected to the sensor pixel circuits 102 on the n-th row.

Figure 2B:
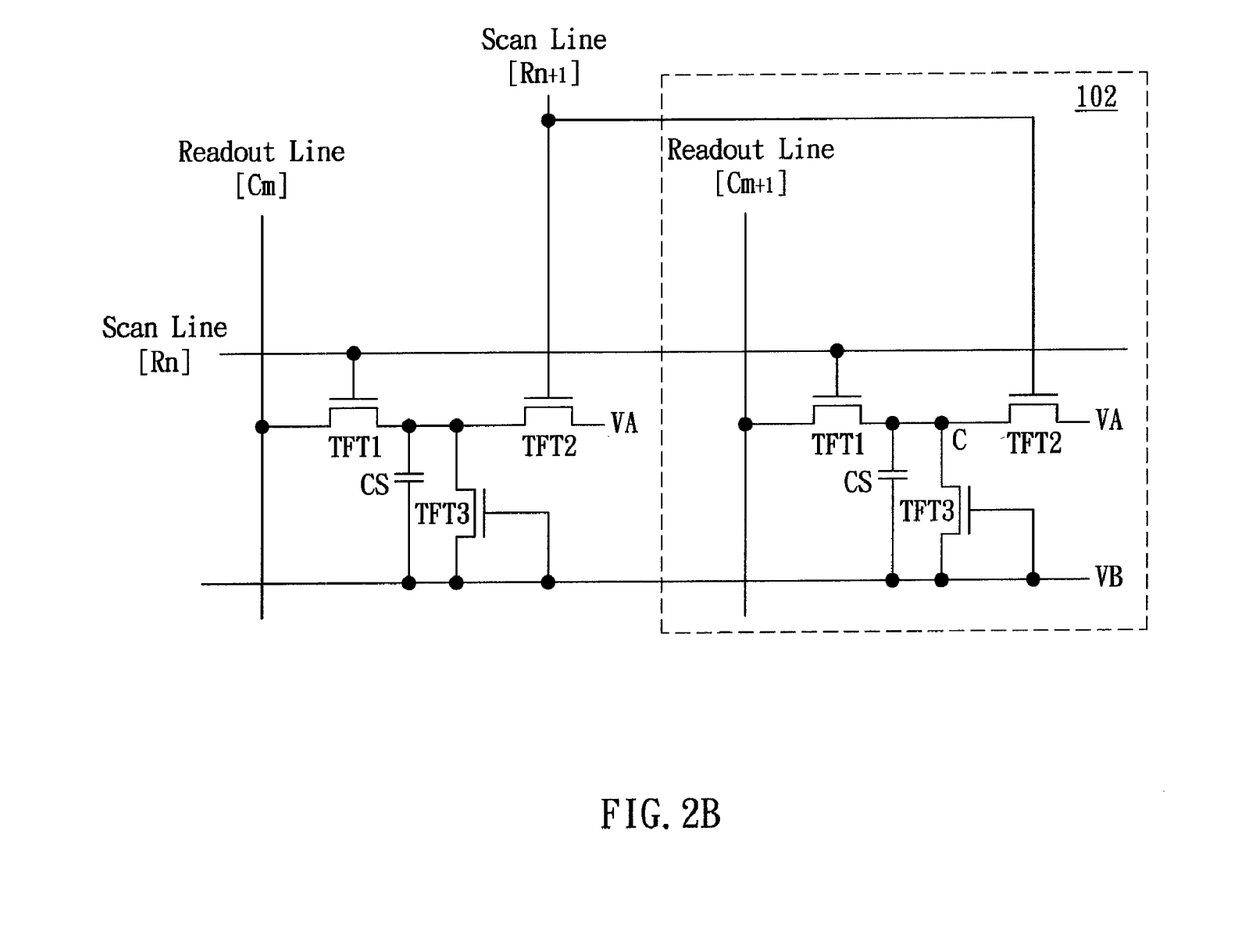
FIG. 2B illustrates the architecture of the sensor pixel circuits of FIG. 1 according to a modified embodiment of the present invention.

In a modified embodiment as shown in FIG. 2B, scan line of the next row instead of reset signal is associated with and connected to all of the sensor pixel circuits 102 on the current row. In this exemplary figure, Scan Line [$R_{n+1}$] is connected to the sensor pixel circuits 102 on the n-th row.

Still referring to FIG. 2A, specifically speaking, with respect to the first readout TFT (TFT1), one of the source/drain is electrically connected to the associated Readout Line [$C_{m+1}$], the gate is electrically connected to the associated Scan Line [$R_n$], and the other one of the source/drain is electrically connected to the second readout TFT (TFT2) and the photo TFT (TFT3) at a (charge) node C. With respect to the second readout TFT (TFT2), one of the source/drain is electrically connected to the first readout TFT (TFT1) at the node C, the gate is electrically connected to the associated Reset [n] signal, and the other one of the source/drain is electrically connected to a reset voltage VA. With respect to the photo TFT (TFT3), one of the source/drain is electrically connected to the first readout TFT (TFT1) and the second readout TFT (TFT2) at the node C, the gate and the other one of the source/drain are electrically connected to a reset voltage VB, which has a value less than the value of VA (i.e., VA>VB). Between the node C and the node of the reset voltage VB exist a (fixed) storage capacitance CS.

In the modified embodiment of FIG. 2B, all the arrangements described above with respect to FIG. 2A are equally applied except that the gate of the second readout TFT (TFT2) is electrically connected to the Scan Line [$R_{n+1}$] of the next row.

Figure 3:
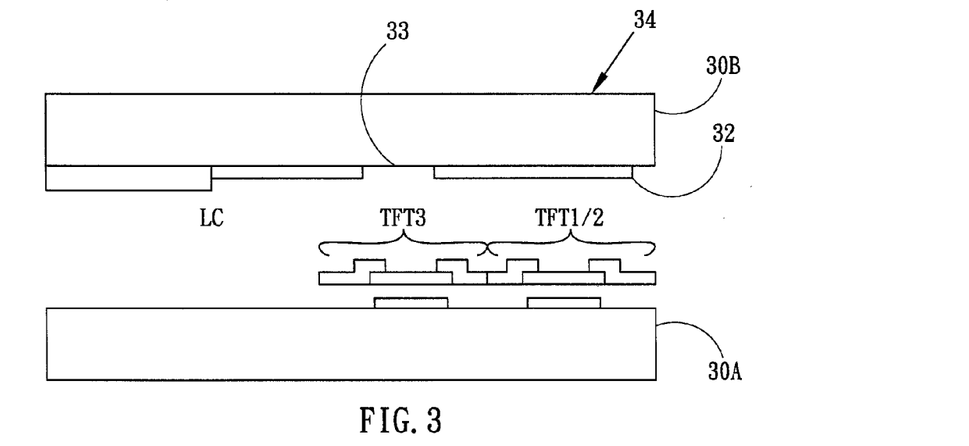
FIG. 3 illustrates a cross sectional view of the sensor pixel circuit of FIG. 2 according to one embodiment of the present invention.

FIG. 3 illustrates a cross sectional view of the sensor pixel circuit 102 of FIG. 2 according to one embodiment of the present invention. For the sake of brevity, only the primary elements of the TFT finger sensor are shown in the figure, and the LCD except liquid crystal (LC) is not shown. The photo TFT (TFT3) and the first/second readout TFT (TFT1/2) are formed on one substrate (such as glass) 30A. A light shielding layer (such as black matrix) 32 is formed on another substrate (such as glass) 30B, and has an opening 33 over the photo TFT (TFT3), and the photo TFT (TFT3) therefore will generate photo leakage current when exposed to ambient light or external light source. Contrarily, the light shielding layer 32 does not have an opening (i.e., closed) over the first/second readout TFT (TFT1/2), and the first/second readout TFT (TFT1/2) will not generate photo leakage current when exposed to ambient light.

Figure 4A:
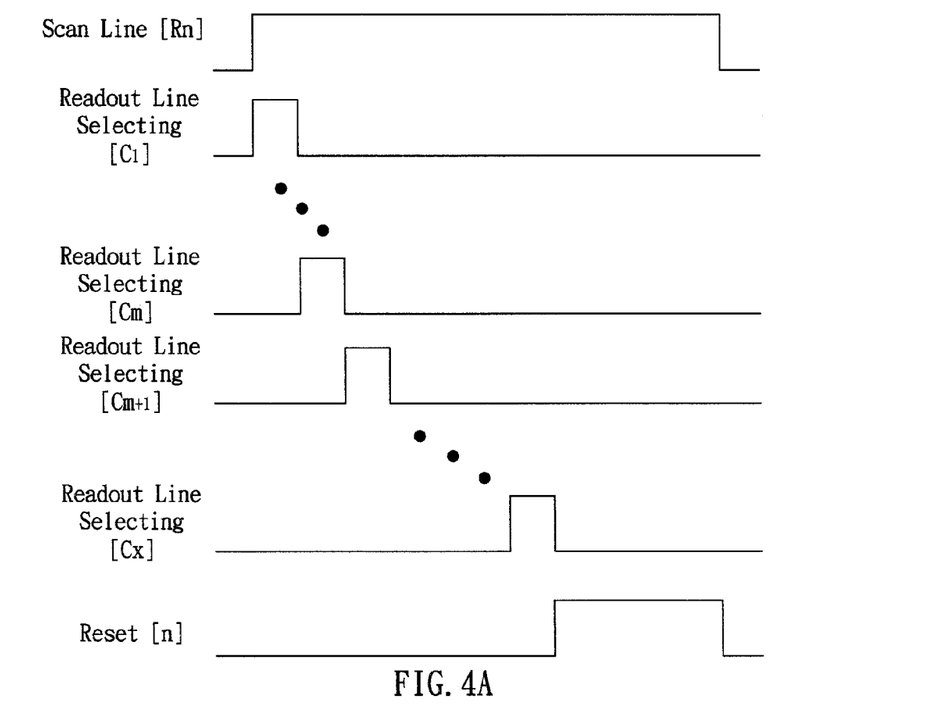
FIG. 4A shows an exemplary timing diagram of associated signals of the finger sensor according to the embodiment of FIG. 2A.

FIG. 4A shows an exemplary timing diagram of associated signals of the finger sensor according to the embodiment of FIG. 2A. In one line scan, for example the line scan for the n-th row as shown in the figure, while the Scan Line [$R_n$] is asserted, Readout Line Selecting [$C_1$]-[$C_x$] signals (to the readout circuit 14) respectively associated with columns of sensor pixel circuits 102 are asserted in sequence. The Rest [n] signal is asserted at the end of the assertion of the Scan Line [$R_n$].

The operation of the finger sensor of FIG. 2A will be specifically described below while referring to FIG. 4A. Assume a finger has been placed on a surface 34 (FIG. 3) of the finger sensor, and the second readout TFT (TFT2) is reset by the Reset [n] signal in the pervious frame scan (e.g., Frame [n−1]) (now shown), the voltage at the node C thus becomes VA. For the portions of the active matrix area 10 not covered by the finger, the associated photo TFTs (TFT3) are exposed to ambient light, and the node C is therefore discharged to the voltage VB through the associated photo TFT (TFT3). There exist in-between situations, in which the active matrix area 10 is not fully covered by the finger or the palm, and the voltage VC at the node C could be expressed as:

$$VC=VB+(VA-VB)\times e^{-t/RC}$$

where RC is the time constant between the node C and the node of the voltage VB; and t is the elapsed time.

As the Scan Line [$R_n$] is asserted in the current frame scan (e.g., Frame [n]) (as shown) and the associated Readout Line [$C_{m+1}$] is selected by the Readout Line Selecting [$C_{m+1}$] signal, the voltage (VA/VB) at the node C is read out through the first readout TFT (TFT1) to the readout circuit 14, which analyzes and converts the analog signals of the readout lines into digital signals. The converted digital signals are subsequently forwarded to the image processing circuit 16 to determine the location and image of the finger or fingers.

Figure 4B:
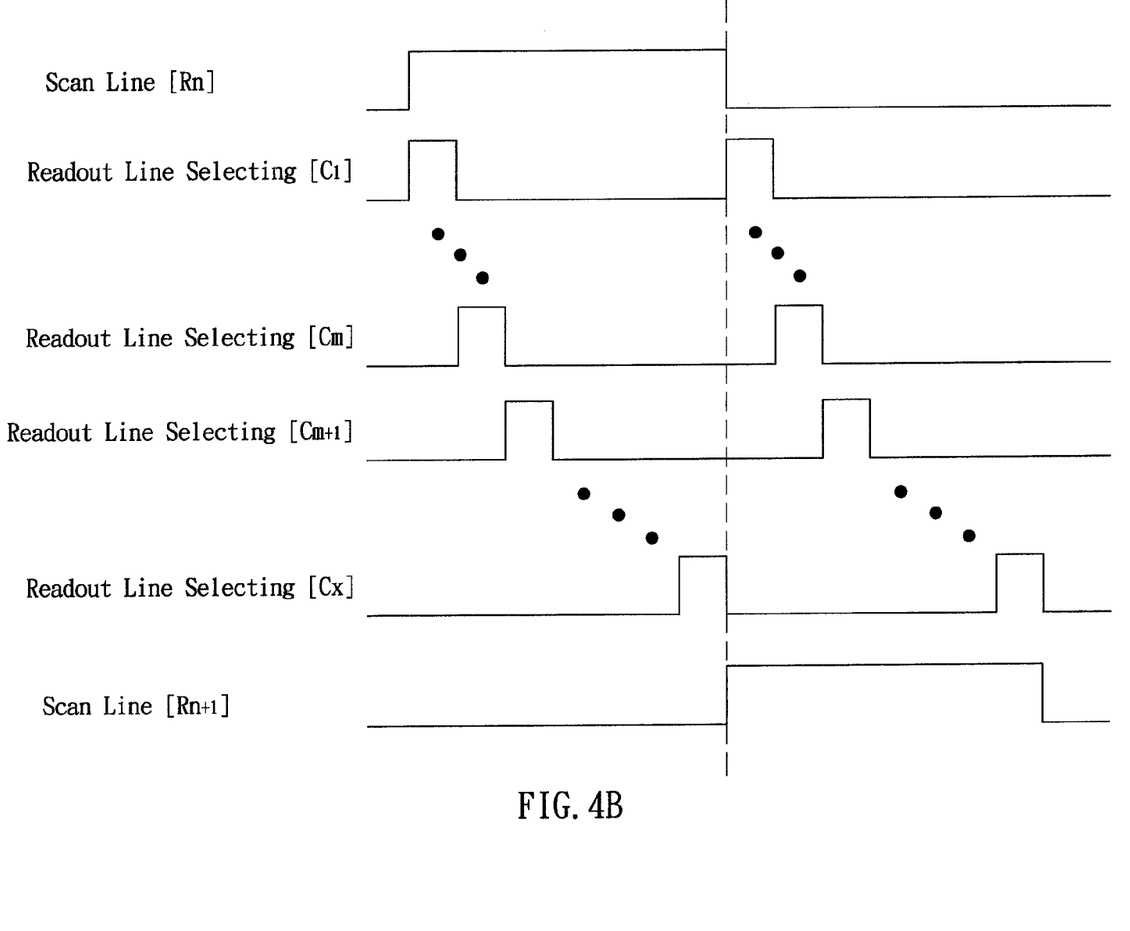
FIG. 4B shows an exemplary timing diagram of associated signals of the finger sensor according to the embodiment of FIG. 2B.

FIG. 4B shows an exemplary timing diagram of associated signals of the finger sensor according to the embodiment of FIG. 2B. In one line scan, for example the line scan for the n-th row as shown to the left of dotted line in the figure, while the Scan Line [$R_n$] is asserted, Readout Line Selecting [$C_1$]-[$C_x$] signals (to the readout circuit 14) respectively associated with columns of sensor pixel circuits 102 are asserted in sequence. Similarly, another line scan for the (n+1)-th row (shown to the right of the dotted line) follows the same manner.

The operation of the finger sensor of FIG. 2B will be specifically described below while referring to FIG. 4B. Assume a finger has been placed on a surface 34 (FIG. 3) of the finger sensor, as the second readout TFT (TFT2) is reset by the next Scan Line [$R_{n+1}$] signal in the pervious frame scan (e.g., Frame [n−1]) (not shown), the voltage at the node C thus becomes VA. For the portions of the active matrix area 10 not covered by the finger, the associated photo TFTs (TFT3) are exposed to ambient light, and the node C is therefore discharged to the voltage VB through the associated photo TFT (TFT3). As the Scan Line [$R_n$] is asserted in the current frame scan (e.g., Frame [n]) (as shown) and the associated Readout Line [$C_{m+1}$] is selected by the Readout Line Selecting [Cm+1] signal, the voltage (VA/VB) at the node C is read out through the first readout TFT (TFT1) to the readout circuit 14, which analyzes and converts the analog signals of the readout lines into digital signals. The converted digital signals are subsequently forwarded to the image processing circuit 16 to determine the location and image of the finger or fingers.

Figure 5A:
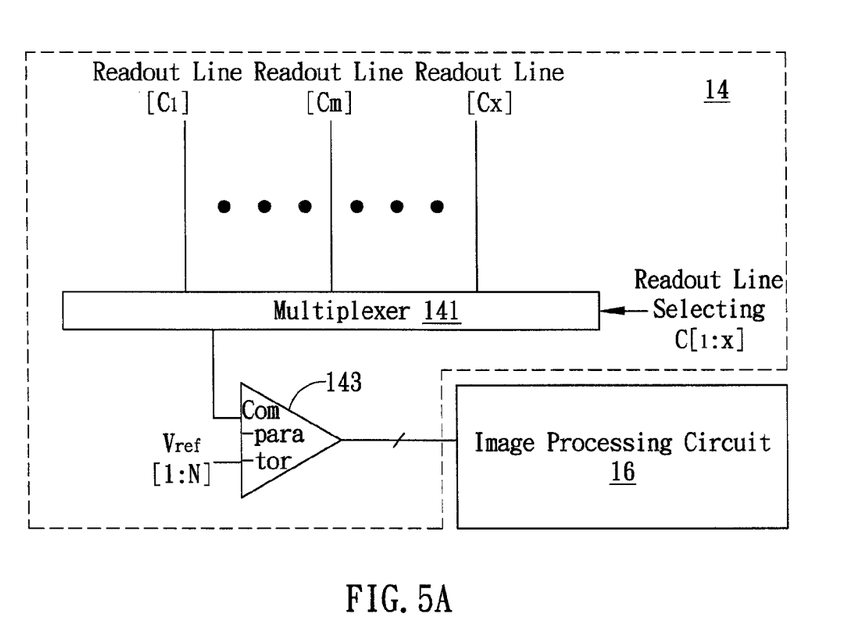
FIG. 5A illustrates one embodiment of the readout circuit in FIG. 1.

FIG. 5A illustrates one embodiment of the readout circuit 14 in FIG. 1. A number of readout lines respectively corresponding to columns of sensor pixel circuits are connected and inputted to a multiplexer 141. One of the readout lines is selected in turn according to Readout Line Selecting signal. The selected analog signal is converted into digital signal by comparing the selected analog signal with a predetermined reference voltage $V_{ref}$[1:N] through a comparator 143, resulting in an N-bit output. The output of the comparator 143 is further fed to the image processing circuit 16 for further processing.

Figure 5B:
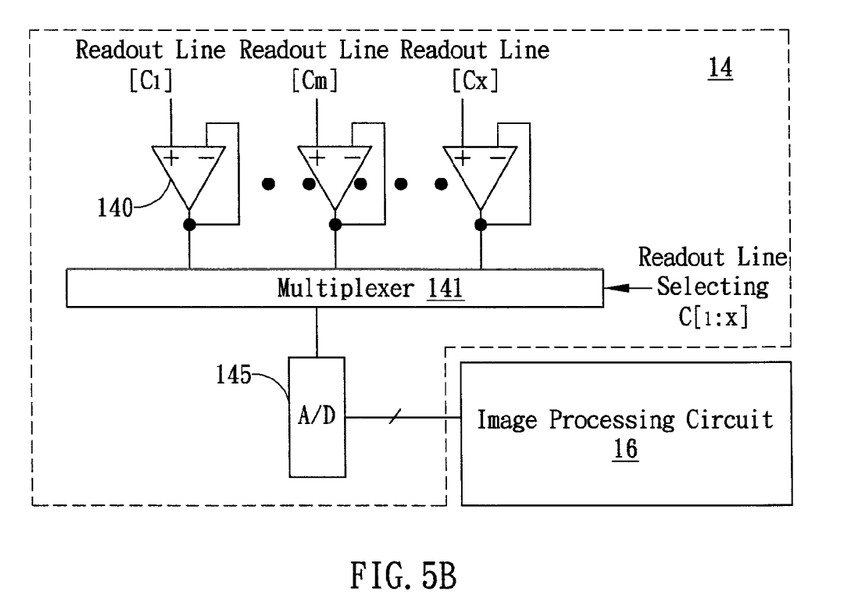
FIG. 5B illustrates another embodiment of the readout circuit in FIG. 1.

FIG. 5B illustrates another embodiment of the readout circuit 14 in FIG. 1. The readout lines respectively corresponding to columns of sensor pixel circuits are connected and inputted to a number of buffers 140. It is noted that the buffers 140 could be also used in the readout circuit 14 of FIG. 5A in the same manner; while the buffers 140 of FIG. 5A or 5B could be omitted. The outputs of the buffers 140 are inputted to a multiplexer 141. One of the readout lines is selected in turn according to Readout Line Selecting signal. The selected analog signal is converted into digital signal by an analog-to-digital (A/D) converter 145, resulting in an N-bit output. The output of the A/D converter 145 is further fed to the image processing circuit 16 for further processing.

Figure 6:
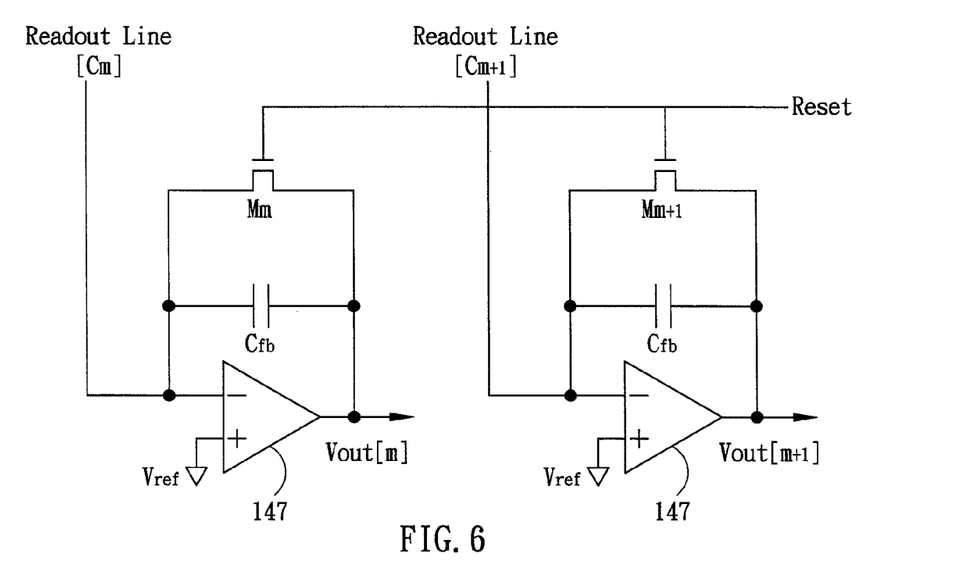
FIG. 6 illustrates portions of a modified embodiment of FIG. 5A or FIG. 5B.

FIG. 6 illustrates portions of a modified embodiment of FIG. 5A or FIG. 5B. In the modified embodiment, the readout lines respectively corresponding to columns of sensor pixel circuits are connected and inputted to integrating circuits (such as integrator operational amplifiers (OP-Amp)) 147, rather than to the multiplexer 141 (FIG. 5A) or the buffers 140 (FIG. 5B). A feedback capacitor $C_{fb}$ is connected between the output and the inverting input of each integrator OP-Amp 147, while the non-inverting input of the integrator OP-Amp 147 is connected with a predetermined reference voltage $V_{ref}$, which has a value between VA and VB (i.e., VA>$V_{ref}$>VB). The source and drain of a reset transistor M is connected across the ends of the feedback capacitor $C_{fb}$, and its gate electrode is connected to a Reset signal. This Reset signal could be the same signal as that in FIG. 4A, or could be separate reset signal other than that in FIG. 4A. In this embodiment, the Reset signal is asserted at the end of the assertion of each scan line to reset the output of the integrator OP-Amp 147 to $V_{ref}$ through the reset transistor M, and the integrator OP-Amp 147 is ready for performing integration for the next scan line. The output of the integrator OP-Amp 147 is further connected to the multiplexer 141 (FIG. 5A) or the buffers 140 (FIG. 5B).

The operation of the integrating circuits of FIG. 6 will be specifically described below. As described above, when a finger has been placed on a surface 34 (FIG. 3) of the finger sensor, the voltage at the node C thus becomes VA; otherwise the voltage at the node C becomes VB. Before the integration, the reset transistors M are closed by the Reset signal in a previous frame scan. Subsequently, in the current frame scan with the reset transistors M opened, through to the integrator OP-Amp 147, the voltage VA with the presence of finger(s), and the voltage VB with the absence of finger(s), are integrated at the output of the integrator OP-Amp 147 as follows respectively:

$$V_{out(min)} = V_{ref} - \frac{(VA - V_{ref}) \times CS}{C_{fb}} \text{ (presence of finger(s))}$$

$$V_{out(max)} = V_{ref} + \frac{(V_{ref} - VB) \times CS}{C_{fb}} \text{ (when } VC = VB\text{)(absence of finger(s))}$$

Compared to the previous embodiments, the embodiment of FIG. 6 has advantage of higher resistance to noise than the previous embodiments. Specifically speaking, in the previous embodiments, the determination interval is (VA−VB) for determining the voltage at the node C is whether VA or VB. On the other hand, in the embodiment of FIG. 6, the determination interval becomes $$\frac{(VA - VB) \times CS}{C_{fb}} (= V_{out(max)} - V_{out(min)})$$

for determining the output voltage of the integrator OP-Amp 147. With appropriately select of ($CS/C_{fb}$), the determination interval $$\left( \frac{(VA - VB) \times CS}{C_{fb}} \right)$$

can be made to a value having enough resistance to noise, thus making the embodiment of FIG. 6 less susceptible to erroneous determination.

Figure 7:
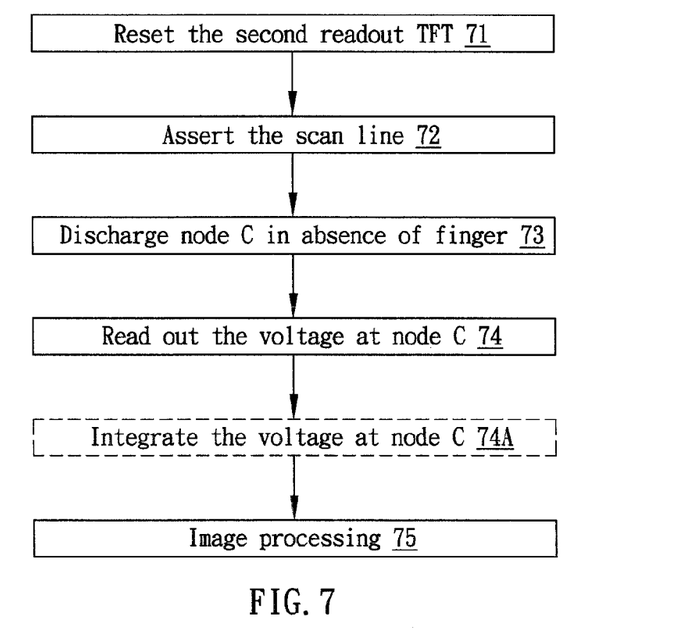
FIG. 7 shows a flow chart illustrating a method of sensing a finger according to one embodiment of the present invention.

FIG. 7 shows a flow chart illustrating a method of sensing a finger according to one embodiment of the present invention. At the outset, in step 71, the second readout TFT (TFT2) is reset to voltage VA at the node C by the reset signal (or the scan line of next row) in the pervious frame scan, followed by asserting the scan line (of the current row) in the current frame scan (step 72). When a finger has been placed on a surface 34 (FIG. 3), the voltage at the node C becomes VA; otherwise for the portions of the active matrix area 10 not covered by the finger, the associated photo TFTs (TFT3) are exposed to ambient light, and the node C is therefore discharged to the voltage VB through the associated photo TFT (TFT3) (step 73). The voltage value at the node C is subsequently read out by the readout circuit 14 (step 74), which analyzes and converts the analog signals of the readout lines into digital signals. The converted digital signals are subsequently, in step 75, forwarded to the image processing circuit 16 to determine the location and image of the finger(s). If the modified embodiment of FIG. 6 is adapted, a further step 74A is performed to integrate the voltage value (VA/VB or in-between) at the node C.

Although specific embodiments have been illustrated and described, it will be appreciated by those skilled in the art that various modifications may be made without departing from the scope of the present invention, which is intended to be limited solely by the appended claims.

What is claimed is:

1. An optical sensor, comprising:
   an active matrix area having a plurality of sensor pixel circuits arranged in matrix form; and
   a plurality of scan lines and readout lines arranged in the active matrix area such that the scan lines and the readout lines respectively cross each other at one of the sensor pixel circuits,
   wherein each of the sensor pixel circuits includes a first readout TFT for reading out voltage of a charge node, a second readout TFT for controllably resetting the charge node to a first reset voltage, a photo TFT for discharging the voltage at the charge node to a second reset voltage in absence of an object or objects, the second reset voltage being less than the first reset voltage, and a storage capacitor with a first end connected to the charge node and a second end connected to receive the second reset voltage;
   wherein the storage capacitor is reset by the second readout TFT such that the first end is at the first reset voltage and the second end is at the second reset voltage, thereby resulting in a voltage difference between the first reset voltage and the second reset voltage across the storage capacitor.

2. The optical sensor according to claim 1, further comprising a scan driver for sequentially asserting the scan lines.

3. The optical sensor according to claim 1, further comprising a readout circuit for analyzing analog signals outputted from the active matrix area, and then converting the analog signals into digital signals.

4. The optical sensor according to claim 1, further comprising an image processing circuit for determining location and image of the object or objects.

5. The optical sensor according to claim 1, wherein the second readout TFT is reset by a reset signal.

6. The optical sensor according to claim 1, wherein the second readout TFT of a current row is reset by the scan line of a next row.

7. The optical sensor according to claim 5, wherein:
the first readout TFT having one of source/drain being electrically connected to the associated readout line, a gate being electrically connected to the associated scan line, and the other one of the source/drain being electrically connected to the second readout TFT and the photo TFT at the charge node;
the second readout TFT having one of source/drain being electrically connected to the first readout TFT at the charge node, a gate being electrically connected to the associated reset signal, and the other one of the source/drain being electrically connected to the first reset voltage; and
the photo TFT having one of source/drain being electrically connected to the first readout TFT and the second readout TFT at the charge node, a gate and the other one of the source/drain being electrically connected to the second reset voltage.

8. The optical sensor according to claim 6, wherein:
the first readout TFT having one of source/drain being electrically connected to the associated readout line, a gate being electrically connected to the associated scan line, and the other one of the source/drain being electrically connected to the second readout TFT and the photo TFT at the charge node;
the second readout TFT having one of source/drain being electrically connected to the first readout TFT at the charge node, a gate being electrically connected to the associated scan line of the next row, and the other one of the source/drain being electrically connected to the first reset voltage; and
the photo TFT having one of source/drain being electrically connected to the first readout TFT and the second readout TFT at the charge node, a gate and the other one of the source/drain being electrically connected to the second reset voltage.

9. The optical sensor according to claim 1, further comprising:
a first substrate on which the first readout TFT, the second readout TFT, and the photo TFT are formed;
a second substrate; and
a light shielding layer formed on the second substrate, wherein the light shielding layer has an opening over the photo TFT, and the light shielding layer is closed over the first and second readout TFTs.

10. The optical sensor according to claim 3, wherein the readout circuit comprises:
a multiplexer for inputting the readout lines, among which one of the readout lines is selected according to readout line selecting signals; and
a comparator for comparing the analog signal of the selected readout line with a predetermined reference voltage.

11. The optical sensor according to claim 3, wherein the readout circuit comprises:
a multiplexer for inputting the readout lines, among which one of the readout lines is selected according to readout line selecting signals; and
an analog-to-digital converter for converting the analog signal of the selected readout line into the digital signal.

12. The optical sensor according to claim 11, further comprising:
a plurality of buffers inserted between the active matrix area and the multiplexer.

13. The optical sensor according to claim 3, further comprising:
a plurality of integrating circuits connected to receive output of the active matrix area, wherein the integrating circuits respectively connect to the readout lines.

14. The optical sensor according to claim 13, wherein each the integrating circuit comprises:
an integrator operational amplifier;
a feedback capacitor connected between output and inverting input of the integrator operational amplifier;
a predetermined reference voltage connected to non-inverting input of the integrator operational amplifier, wherein the predetermined reference voltage has a value between the first reset voltage and the second reset voltage; and
a reset transistor having source and drain connected across ends of the feedback capacitor, and a gate connected to a reset signal.

15. An optical sensing method, comprising:
resetting a charge node of an optical sensor to a first reset voltage in a previous frame scan;
asserting scan line of a current row of sensor pixel circuits of a current frame scan; and
discharging the charge node to a second reset voltage when the associated sensor pixel circuit of the optical sensor is not covered by an object or objects, and otherwise the charge node remains at the first reset voltage;
wherein a storage capacitor is provided with a first end connected to the charge node and a second end connected to receive the second reset voltage; and
wherein the storage capacitor is reset such that the first end is at the first reset voltage and the second end is at the second reset voltage, thereby resulting in a voltage difference between the first reset voltage and the second reset voltage across the storage capacitor.

16. The optical sensing method according to claim 15, further comprising:
reading out voltage of the charge node by converting analog signals into digital signals; and
processing the digital signals to determine location and image of the object or objects.

17. The optical sensing method according to claim 15, wherein the charge node is reset by a reset signal.

18. The optical sensing method according to claim 15, wherein the charge node is reset by the scan line of a next row.

19. The optical sensing method according to claim 15, further comprising the step of integrating the voltage at the charge node.

* * * * *